US012762667B2

(12) United States Patent
Isobe

(10) Patent No.: US 12,762,667 B2
(45) Date of Patent: Oct. 13, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shingo Isobe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 18/883,291

(22) Filed: Sep. 12, 2024

(65) Prior Publication Data

US 2025/0104200 A1 Mar. 27, 2025

(30) Foreign Application Priority Data

Sep. 22, 2023 (JP) ................................ 2023-158508

(51) Int. Cl.
*G06T 5/70* (2024.01)

(52) U.S. Cl.
CPC ...... *G06T 5/70* (2024.01); *G06T 2207/20084* (2013.01)

(58) Field of Classification Search
CPC ............. G06T 5/70; G06T 2207/20012; G06T 2207/20084; G06T 2207/30168; G06V 10/25; G06V 20/52; G06V 10/82
See application file for complete search history.

(56) References Cited

U.S. PATENT DOCUMENTS 6,594,378 B1 * 7/2003 Li .............................. G06T 3/14 382/128
8,249,341 B2 * 8/2012 Ishiga ........................ G06T 5/70 382/167

(Continued)

FOREIGN PATENT DOCUMENTS

EP 1944982 A1 7/2008
JP 2007110338 A 4/2007

(Continued)

OTHER PUBLICATIONS

Zhang Yushu, et al., "A Patch Based Denoising Method Using Deep Convolutional Neural Network for Seismic Image", IEEE Access, vol. 7, Oct. 28, 2019 (Oct. 28, 2019), pp. 156883-156894, XP011756577, DOI: 10.1109/ACCESS.2019.2949774.

(Continued)

*Primary Examiner* — Manav Seth
(74) *Attorney, Agent, or Firm* — Cowan, Liebowitz & Latman, P.C.

(57) ABSTRACT

An image processing apparatus comprising: one or more memories storing instructions; and one or more processors executing the instructions to: execute first setting processing for setting a reduced region in an image; execute second setting processing for setting an estimation region in the image based on the reduced region; execute estimation processing for estimating a noise characteristic of the estimation region; and execute noise reduction processing that reduces noise in the reduced region of the image according to a parameter based on the noise characteristic, wherein in the second setting processing, when a surface area of the reduced region is smaller than a threshold surface area, the estimation region is set to be at least as large as the threshold surface area.

13 Claims, 15 Drawing Sheets

(56) References Cited

U.S. PATENT DOCUMENTS

| | | | | |
|---|---|---|---|---|
| 8,860,829 | B2 * | 10/2014 | Myokan | G06T 5/50 348/208.99 |
| 9,103,896 | B2 * | 8/2015 | Gross | G01R 33/5612 |
| 9,613,402 | B2 * | 4/2017 | Takahashi | A61B 1/000095 |
| 9,911,060 | B2 * | 3/2018 | Takahama | G06T 5/20 |
| 2014/0118578 | A1 * | 5/2014 | Sasaki | G06T 5/20 348/241 |
| 2020/0380641 | A1 * | 12/2020 | Higaki | G06N 3/04 |
| 2022/0237747 | A1 * | 7/2022 | Nozaki | H04N 23/683 |

FOREIGN PATENT DOCUMENTS

| | | | | |
|---|---|---|---|---|
| JP | 2018032447 | A | 3/2018 | |
| JP | 2020197915 | A | 12/2020 | |
| JP | 2021060847 | A | 4/2021 | |
| JP | 2021118403 | A | 8/2021 | |
| JP | 2022112942 | A | 8/2022 | |
| WO | WO-2022099133 | A1 * | 5/2022 | G06F 18/217 |

OTHER PUBLICATIONS

Chen Guangyong, et al., "An Efficient Statistical Method for Image Noise Level Estimation", 2015 IEEE International Conference on Computer Vision (ICCV), IEEE, Dec. 7, 2015, pp. 477-485, XP032866367, DOI: 10.1109/ICCV.2015.62.

The above foreign patent document #1 and Non-Patent Literature Documents #1 and #2 were cited in a European Search Report issued on Feb. 25, 2025, which is enclosed, that issued in the corresponding European Patent Application No. 24201244.1.

The above foreign patent documents were cited in the May 16, 2025 Japanese Office Action, which is enclosed without an English Translation, that issued in Japanese Patent Application No. 2023-158508.

* cited by examiner

FIG. 11

| | | | | | | | |
|---|---|---|---|---|---|---|---|
| 0 | 1 | 1 | 1 | 1 | 0 | 1 | 1 |
| 0 | 0 | 1 | 0 | 1 | 0 | 0 | 1 |
| 0 | 1 | 1 | 1 | 1 | 0 | 1 | 1 |
| 0 | 0 | 1 | 0 | 1 | 0 | 0 | 1 |
| 0 | 1 | 1 | 1 | 1 | 0 | 1 | 1 |
| 0 | 0 | 1 | 0 | 1 | 0 | 0 | 1 |
| 0 | 0 | 1 | 0 | 1 | 0 | 0 | 1 |

FIG. 12A

| LUMI-NANCE | Gain1 | Gain2 | Gain3 | ··· | GainN |
|---|---|---|---|---|---|
| 1 | 0 | 2 | 4 | ··· | 12 |
| 10 | 0 | 3 | 5 | ··· | 13 |
| 20 | 1 | 3 | 5 | ··· | 14 |
| 30 | 2 | 4 | 6 | ··· | 14 |
| 40 | 3 | 4 | 6 | ··· | 15 |
| 50 | 4 | 5 | 7 | ··· | 15 |
| ··· | ··· | ··· | ··· | ··· | ··· |
| 100 | 5 | 6 | 7 | ··· | 16 |
| ··· | ··· | ··· | ··· | ··· | ··· |
| 200 | 6 | 7 | 8 | ··· | 18 |
| ··· | ··· | ··· | ··· | ··· | ··· |
| 255 | 6 | 7 | 8 | ··· | 20 |

FIG. 12B

| LUMI-NANCE | Gain1 | Gain2 | Gain3 | ··· | GainN |
|---|---|---|---|---|---|
| 1 | 2 | 4 | 6 | ··· | 14 |
| 10 | 2 | 5 | 7 | ··· | 15 |
| 20 | 3 | 5 | 7 | ··· | 16 |
| 30 | 4 | 6 | 8 | ··· | 16 |
| 40 | 5 | 4 | 8 | ··· | 17 |
| 50 | 6 | 7 | 9 | ··· | 17 |
| ··· | ··· | ··· | ··· | ··· | ··· |
| 100 | 7 | 8 | 9 | ··· | 18 |
| ··· | ··· | ··· | ··· | ··· | ··· |
| 200 | 8 | 9 | 10 | ··· | 20 |
| ··· | ··· | ··· | ··· | ··· | ··· |
| 255 | 8 | 9 | 10 | ··· | 22 |

FIG. 15A
| | X1 | Y1 | X2 | Y2 |
|---|---|---|---|---|
| CAMERA 1 | 200 | 300 | 1600 | 900 |
| CAMERA 2 | 400 | 200 | 1600 | 900 |
| CAMERA 3 | 300 | 100 | 1500 | 980 |
FIG. 15B
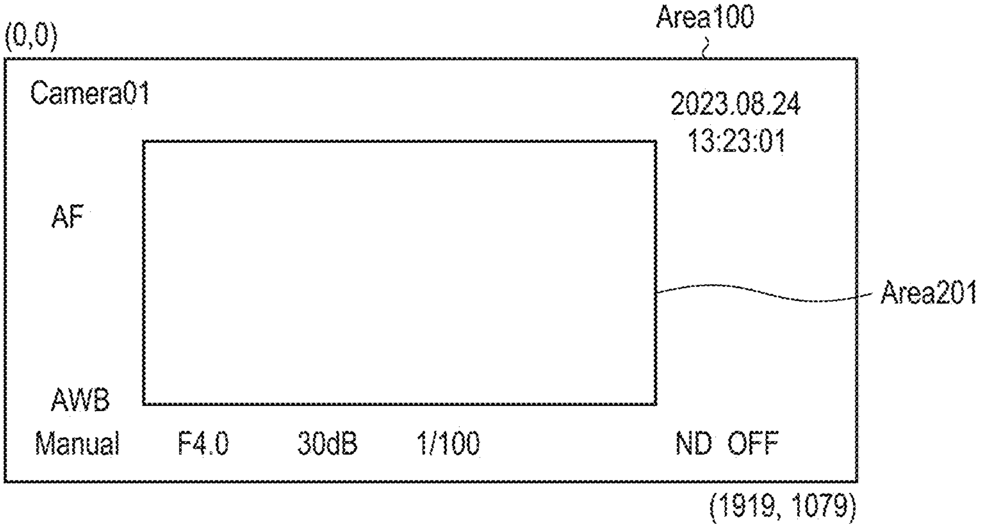
FIG. 15C
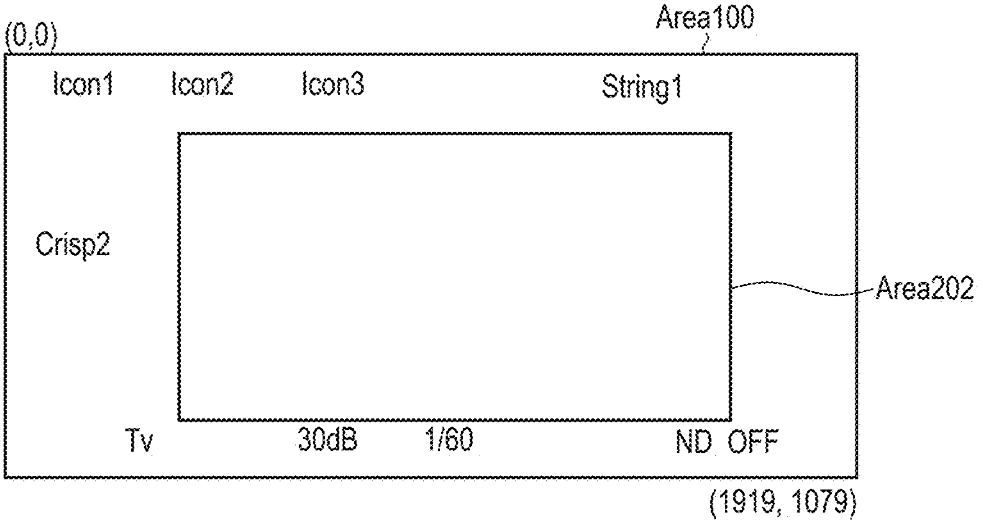

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

In ultra-low-light environments found in surveillance applications, there is a need to improve the visibility of target subjects. An extremely high gain is therefore employed when shooting with a camera. While applying a high gain can brighten the shot, doing so also increases the noise. However, in surveillance applications, the visibility of the subject is prioritized even at the expense of the quality of the image.

Noise reduction ("NR" hereinafter) has generally been used to reduce noise contained in shot video. NR may be applied in the camera, or may be applied by an image processing apparatus outside the camera obtaining an image from the camera. Noise reduction processing based on artificial intelligence techniques using deep learning ("DLNR" hereinafter) is also being used in recent years. Although DLNR has been confirmed to be more effective than conventional NR, the scale of the processing is larger, and thus processing time is an issue.

Incidentally, a technique is known which, when using image processing that takes a long time, increases the overall throughput by taking a partial region of an overall image as a region of interest ("ROI" hereinafter) and reducing the processing time by limiting the region subject to image processing to the ROI. An ROI function may be provided to a photographer.

Japanese Patent Laid-Open No. 2021-118403 discloses a technique for switching whether to perform image restoration processing according to a degree of degradation of each of blocks in an input image. According to Japanese Patent Laid-Open No. 2021-118403, since the region where NR is required as image restoration processing is determined and applied as an ROI, it is possible to apply NR only to the minimum necessary area, which reduces the processing time.

Japanese Patent Laid-Open No. 2007-110338 discloses an example in which a noise amount in the ROI and edges of regions near the ROI are calculated, weighting is applied according to the noise amount and the edges, and noise reduction processing is performed according to the weights.

However, with this past technique, noise is estimated only according to the ROI. There have thus been situations where the noise estimation accuracy drops when the ROI is small, and the noise is not properly removed in the noise removal.

SUMMARY OF THE INVENTION

Accordingly, the present invention provides an image processing apparatus capable of appropriately removing noise in noise removal, even when a region from which noise is to be removed, such as an ROI, is small.

According to one aspect of the present disclosure, there is provided an image processing apparatus comprising: one or more memories storing instructions; and one or more processors executing the instructions to: execute first setting processing for setting a reduced region in an image; execute second setting processing for setting an estimation region in the image based on the reduced region; execute estimation processing for estimating a noise characteristic of the estimation region; and execute noise reduction processing that reduces noise in the reduced region of the image according to a parameter based on the noise characteristic, wherein in the second setting processing, when a surface area of the reduced region is smaller than a threshold surface area, the estimation region is set to be at least as large as the threshold surface area.

According to another aspect of the present disclosure, there is provided an image processing apparatus comprising: one or more memories storing instructions; and one or more processors executing the instructions to: execute setting processing for setting a reduced region in an image; execute second setting processing for setting an estimation region in the image based on the reduced region; execute estimation processing for estimating a noise characteristic of the estimation region; and execute noise reduction processing that reduces noise in the reduced region according to a parameter based on the noise characteristic, wherein in the second setting processing, in a case where an overlaid region in which another image is overlaid is present in the image, the estimation region is set to a region different from the overlaid region.

According to another aspect of the present disclosure, there is provided an image processing method comprising: setting a reduced region in an image; setting an estimation region in the image based on the reduced region; estimating a noise characteristic of the estimation region; and executing noise reduction processing that reduces noise in the reduced region of the image according to a parameter based on the noise characteristic, wherein in the setting of the estimation region, when a surface area of the reduced region is smaller than a threshold surface area, the estimation region is set to be at least as large as the threshold surface area.

According to another aspect of the present disclosure, there is provided a non-transitory computer-readable storage medium having stored thereon a computer program that, when loaded and executed by a computer, causes the computer to: set a reduced region in an image; set an estimation region in the image based on the reduced region; estimate a noise characteristic of the estimation region; and execute noise reduction processing that reduces noise in the reduced region of the image according to a parameter based on the noise characteristic, wherein in the setting of the estimation region, when a surface area of the reduced region is smaller than a threshold surface area, the estimation region is set to be at least as large as the threshold surface area.

Further features of the present invention will become apparent from the following description of exemplary embodiments (with reference to the attached drawings).

BRIEF DESCRIPTION OF THE DRAWINGS

FIG. 11 is a diagram illustrating an example of extracting a flat region.

FIG. 12A is a diagram illustrating an example of noise dispersion characteristics for each of camera settings.

FIG. 12B is a diagram illustrating an example of noise dispersion characteristics for each of camera settings.

FIG. 15A is a table illustrating an example of noise estimation regions for each of camera settings.

FIG. 15B is a diagram illustrating an example of noise estimation regions for each of camera settings.

FIG. 15C is a diagram illustrating an example of noise estimation regions for each of camera settings.

DESCRIPTION OF THE EMBODIMENTS

Figure 1:
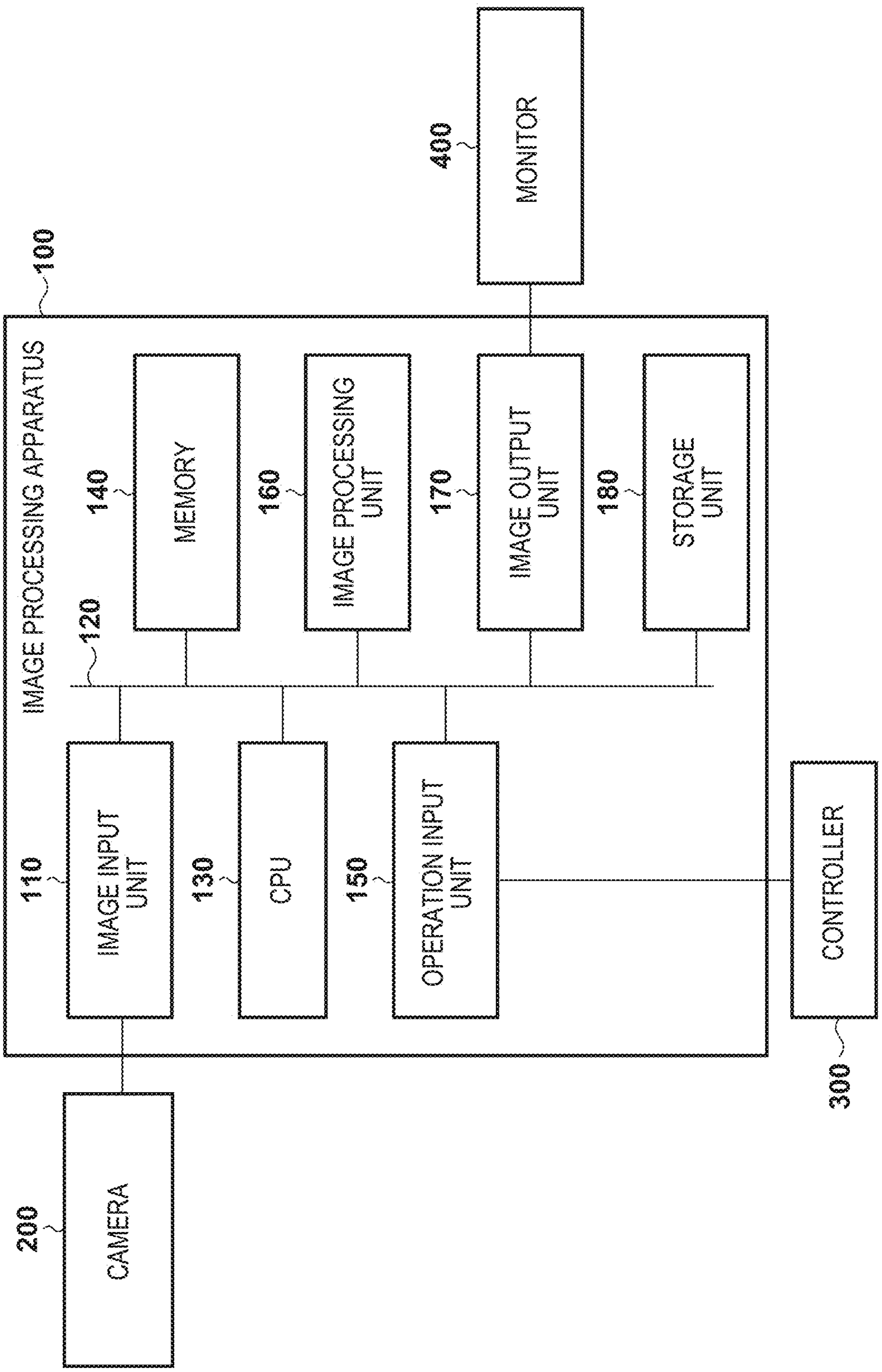
FIG. 1 is a block diagram illustrating an example of the hardware configuration of an image processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiments of the present invention will be described hereinafter. An image processing apparatus according to the present embodiment estimates noise from an input image obtained from a connected camera, infers a desired output image using a neural network ("NN", hereinafter), which is a deep learning model, for an image processing target region set as a region of interest ("ROI", hereinafter), and outputs the inferred image. Note that "image" is a concept including a still image, a moving image, an image from a single frame of a moving image, and the like. The ROI is an example of a "reduced region". In the following descriptions, "image" is a concept including a video, a still image, and a moving image. "Image" may also indicate data of an image. The image processing apparatus trains the NN, such as by bringing a feature distribution of a plurality of training images prepared in advance closer to the feature distribution of a corresponding target image, and optimizes the parameters, such as weights and biases, of the trained neural network. This enables the image processing apparatus to make accurate inferences even for input images on which the NN has not been trained. The image processing apparatus can perform inference on an input image and generate an inferred image in which noise is reduced by holding the parameters of the trained neural network obtained by training the NN multiple times in accordance with the characteristics of the camera.

FIG. 1 is a block diagram illustrating an example of the hardware configuration of an image processing apparatus 100. The image processing apparatus 100 is a computer, such as a personal computer, for example. Although the present embodiment will describe an image processing apparatus, the processing described later can also be executed in an interchangeable lens-type video camera, an interchangeable lens-type camera such as a single-lens reflex camera or a mirrorless single-lens camera, or the like. For example, a camera 200, illustrated in FIG. 1, may execute processing such as image processing (described later).

The camera 200 generates an image by capturing an image of a light beam incident from a subject field. A lens (not shown) is attached to or built into the camera 200, and includes a zoom lens group, a focus lens group, an iris mechanism, and the like. The camera 200 can change an accumulation time for exposure, and an automatic exposure function is used to apply a gain to shot images when shooting in a dark location. The camera 200 outputs the shot image.

As illustrated in FIG. 1, the image processing apparatus 100 includes an image input unit 110, a CPU 130, an operation input unit 150, a memory 140, an image processing unit 160, an image output unit 170, a storage unit 180, and a bus 120. The image input unit 110, the CPU 130, the operation input unit 150, the memory 140, the image processing unit 160, the image output unit 170, and the storage unit 180 are connected over the bus 120 so as to be capable of exchanging data with each other. The CPU 130 and the image processing unit 160 are examples of a first setting unit, a second setting unit, an estimation unit, and a reduction unit.

The image input unit 110 obtains an image output by the camera 200 and saves the image in the memory 140.

The CPU 130 is a central processing unit. Note that in addition to the CPU 130, the image processing apparatus 100 may include a Micro Processing Unit (MPU), a Quantum Processing Unit (QPU), a Graphics Processing Unit (GPU), or the like. The CPU 130 executes the processing executed by the image processing apparatus 100, which will be described later. For example, the CPU 130 implements various functions and executes various processing by executing programs stored in the storage unit 180.

The memory 140 is a random access memory (RAM), for example. The memory 140 temporarily holds image data, programs, and data necessary for executing the programs.

The operation input unit 150 obtains operation signals from an external controller 300, input by a user or the like. The controller 300 includes a keyboard, a mouse, a touch panel, a switch, and the like. The operation signals obtained by the operation input unit 150 are processed by the CPU 130, and setting operations necessary for various types of image processing executed by the image processing unit 160 are performed in response thereto.

The image processing unit 160 reads out and writes images from and to the memory 140, and executes noise estimation processing, ROI processing, NR processing, and UI image generation processing for display in a user interface ("UI" hereinafter) (described later). The image processing unit 160 stores the processed images or the like in the memory 140. The image processing unit 160 may include a Field Programmable Gate Array (FPGA), an Application Specific Integrated Circuit (ASIC), a GPU, or the like. The image processing unit 160 may be implemented as a program executed by the CPU 130.

The image output unit 170 outputs the image processed by the image processing unit 160 and stored in the memory 140 to an external monitor 400. The image output unit 170 outputs an image from a High Definition Multimedia Interface (HDMI; registered trademark) terminal, a Serial Digital Interface (SDI) terminal, or the like of the image processing apparatus 100.

The storage unit 180 includes a hard disk drive (HDD), a solid state drive (SSD), or the like. The storage unit 180 stores programs, data such as parameters necessary for executing the programs, data such as images, and the like.

The monitor 400 receives and displays images output from the image output unit 170 of the image processing apparatus 100. A photographer and a viewer can confirm images shot by the camera 200, menu screens of the image processing apparatus 100, images that have undergone image processing, and the like in the monitor 400.

Although FIG. 1 illustrates elements corresponding to the respective functions, the functions may be implemented by hardware such as one or more ASICs, programmable logic arrays (PLAs), or the like. Alternatively, the above-described configuration may be realized by a programmable processor such as a CPU or an MPU executing software.

Figure 2:
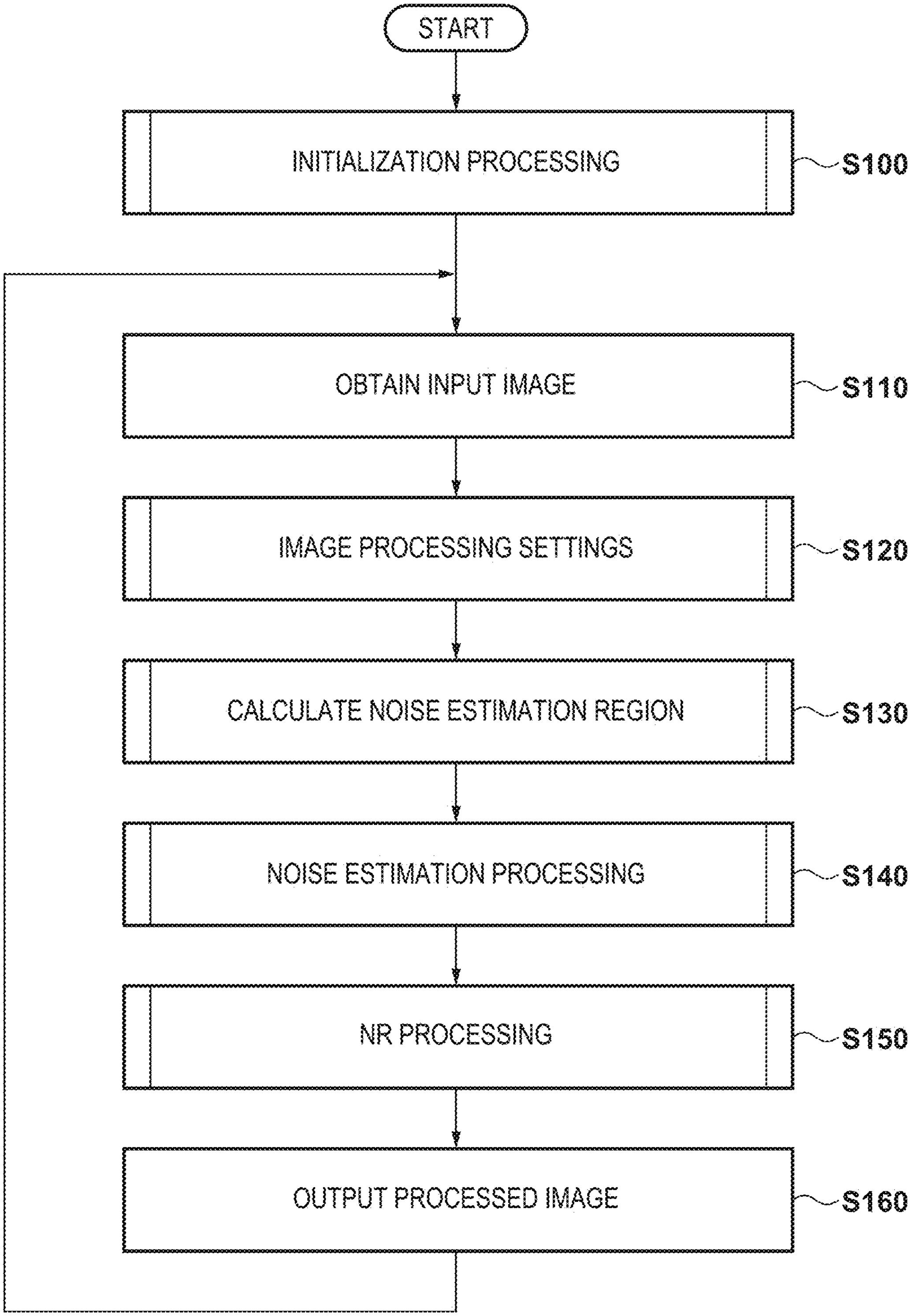
FIG. 2 is a flowchart illustrating image processing performed by the image processing apparatus.

Image processing performed by the CPU 130 in the image processing apparatus 100 will be described next with reference to the flowchart in FIG. 2. FIG. 2 is a flowchart illustrating image processing performed by the image processing apparatus 100. When the image processing apparatus 100 is turned on, the CPU 130 loads a computer program stored in the storage unit 180. As a result, the CPU 130 executes processing in order from step S100 of FIG. 2. Note that once the CPU 130 executes the processing up to step S160 of FIG. 2, the CPU 130 repeats the processing of step S110. The following descriptions assume that the CPU 130 executes the processing from step S110 to step S160 for each frame of an input image from the camera 200.

Figure 3:
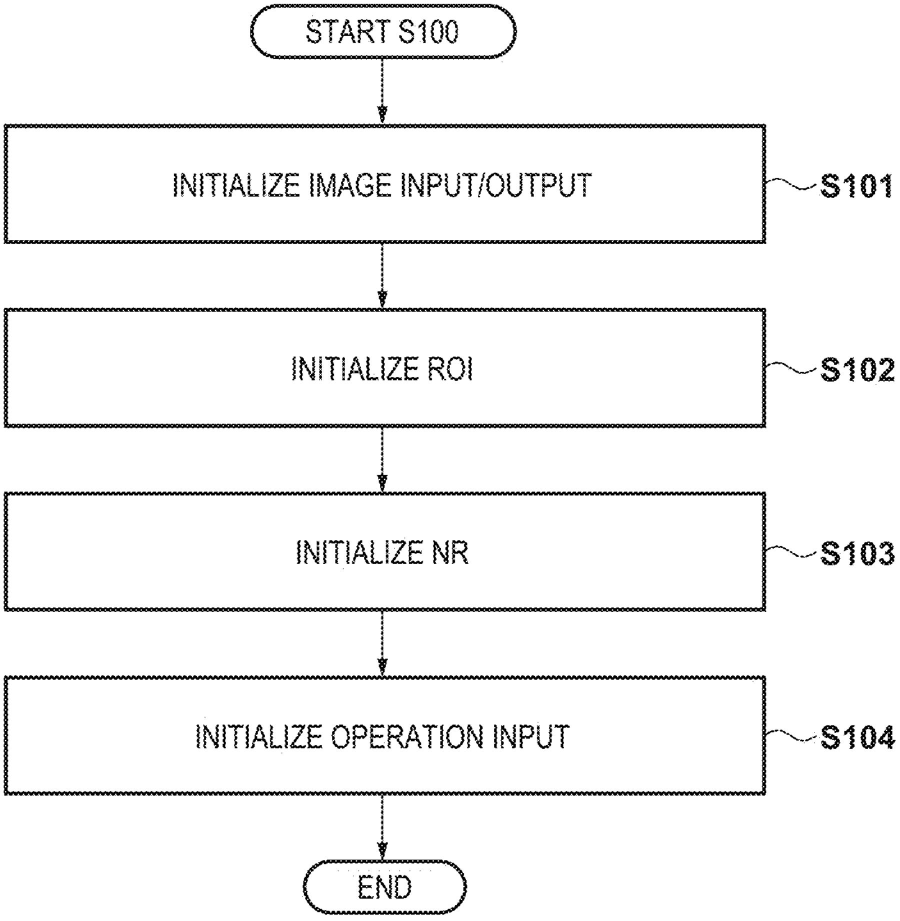
FIG. 3 is a flowchart illustrating an initialization processing subroutine in step S100.

In step S100 of FIG. 2, the CPU 130 performs initialization processing for the image processing apparatus 100. FIG. 3 illustrates the initialization processing subroutine performed in step S100.

In step S101 of FIG. 3, the CPU 130 executes image input/output initialization processing. The CPU 130 initializes the image input unit 110 and the image output unit 170 such that the image input/output processing can be performed.

In step S102, the CPU 130 executes ROI initialization processing. The CPU 130 sets all pixels of the input image as pixels subject to processing, as initial values for the ROI. For example, if the size of the image input to the image input unit 110 is 1920×1080, the CPU 130 sets starting coordinates (0,0) and ending coordinates (1919,1079) as the initial values for the ROI.

In step S103, the CPU 130 executes NR initialization processing. The CPU 130 loads trained NN parameters, which have been trained in advance, from the storage unit 180 for the NR processing executed by the image processing unit 160. The storage unit 180 holds the trained NN parameters optimized for each model of the camera 200 and for each image quality setting. The CPU 130 sets the NN parameters loaded by the image processing unit 160 in accordance with the various models and image qualities of the camera 200 connected to the image processing apparatus 100.

Figure 4A:
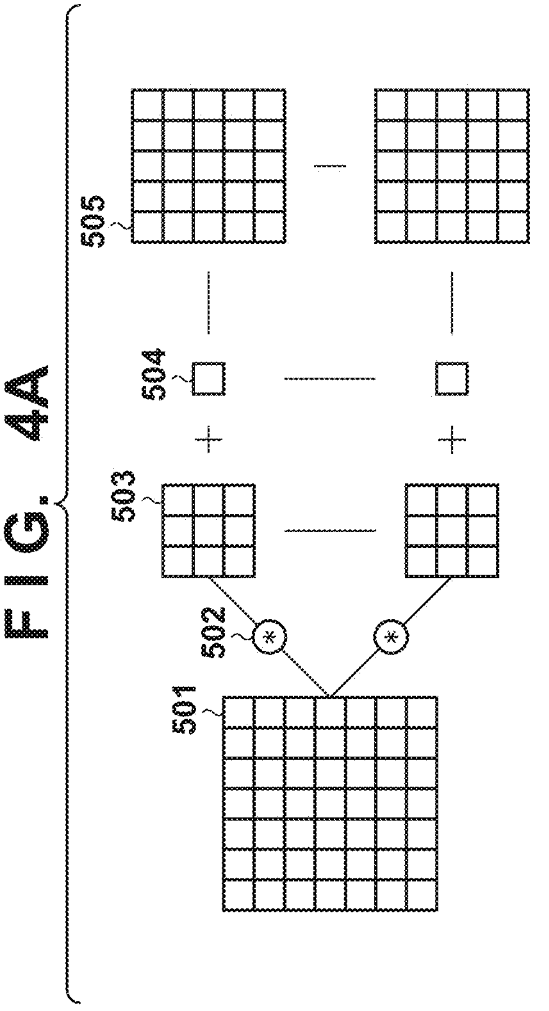
FIGS. 4A and 4B are explanatory diagrams illustrating a neural network.
Figure 4B:
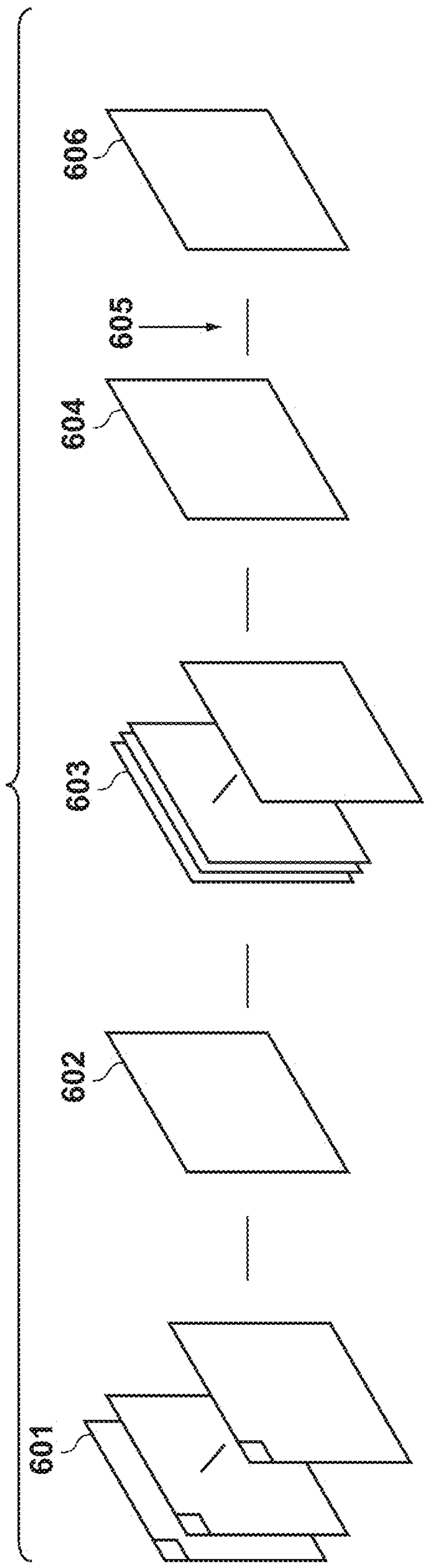

An NN processed by the image processing unit 160, and NN parameters to be loaded, will be described here with reference to FIGS. 4A and 4B. FIGS. 4A and 4B are diagrams illustrating an NN for an input image. FIG. 4A is a diagram illustrating an example of the output of a feature map. FIG. 4B is a diagram illustrating an example of the output of an attention layer.

Although the following will describe an example in which the NN is a Convolutional Neural Network (CNN), the present embodiment is not limited thereto. For example, a Generative Adversarial Network (GAN) or the like may be applied as the NN, or the NN may have skip connections or the like. The NN may also be a recurrent type of network such as a Recurrent Neural Network (RNN) or the like.

In FIG. 4, an input image 501 represents an image or a feature map (described later) input to the NN. A convolution matrix 503 is a filter that performs a convolution operation on the input image 501. Bias 504 is a value added to the result output by a convolution operation 502 of the input image 501 and the convolution matrix 503. A feature map 505 is a convolution operation result after the bias 504 has been added to the result output by the convolution operation 502. Although FIG. 4A depicts only a small number of neurons, intermediate layers, and channels for the sake of simplicity, the number of neurons and layers, the number and weights of connections between neurons, and the like are not limited to this example. In addition, when the NN illustrated in FIGS. 4A and 4B is implemented in an FPGA, an ASIC, or the like, the connections or weights among the neurons may be reduced.

In the CNN, a feature map of the input image is generated by executing convolution operations on the input image using a given filter. Note that the CNN filter may be of any size. In the next layer, the CNN generates a different feature map by executing convolution operations on the feature map of the previous layer using a different filter. In addition, in each layer, the CNN multiplies a given input signal by the filter to calculate the sum with the biases. Then, the CNN applies an activation function to the calculated result and outputs an output signal at each neuron. The weights and biases in each layer are called the "NN parameters", and processing for updating the NN parameters is performed in training. A sigmoid function, a ReLU function, and the like are known as examples of activation functions. The CNN of the present embodiment uses the Leaky ReLU function represented by the following Formula (1), but is not limited thereto. Note that in Formula (1), "max" represents a function that outputs the maximum value of the arguments.

$$f(x)=\max(x,x\times 0.2) \quad \text{Formula (1)}$$

In pre-training for obtaining the NN parameters, the image processing unit 160 of the present embodiment uses images having the noise dispersion characteristics of the camera 200 as the training images, and uses images that do not have the noise corresponding to the training images as target images. The noise dispersion characteristics are examples of noise characteristics. The image processing unit 160 implements NR by executing training that sets the NN parameters having paired the training images with the target images.

The feature map 505 focuses on the noise in the input image, and the image processing unit 160 can apply other parameters to the feature map 505 to learn a region of interest in which the noise component is emphasized. The image processing unit 160 calculates an average in a channel direction for input images 601, obtained by dividing the input image 501 on a color-by-color basis as channels, for example, and generates an intermediate layer 602. The image processing unit 160 performs multiple convolutions on the intermediate layer 602 using Formula (1) to obtain intermediate layers 603. The image processing unit 160 performs convolution on the intermediate layers 603 to bring the number of output channels to 1, and obtains an attention layer 604. The attention layer 604 is an intermediate layer in which a feature appears in a noise region excluding a high-frequency component of a subject. The image processing unit 160 obtains an attention layer 606 in which the noise is enhanced by multiplying the attention layer 604 by a noise strength parameter 605 specifying the strength of the noise reduction processing. The image processing unit 160 convolves the attention layer 606 with the input image 501 described above. As a result, the image processing unit 160 can generate an NN capable of NR processing by adjusting, or in other words, emphasizing, the attention level of the noise region included in the input image, among the input image 501 and the input images 601.

The descriptions will now return to FIG. 3. In step S104, the CPU 130 performs operation input initialization. The CPU 130 performs initialization processing for obtaining operation signals from the controller 300. After performing step S104, the CPU 130 ends the subroutine in step S100 and moves to step S110 of FIG. 2.

Figure 5:
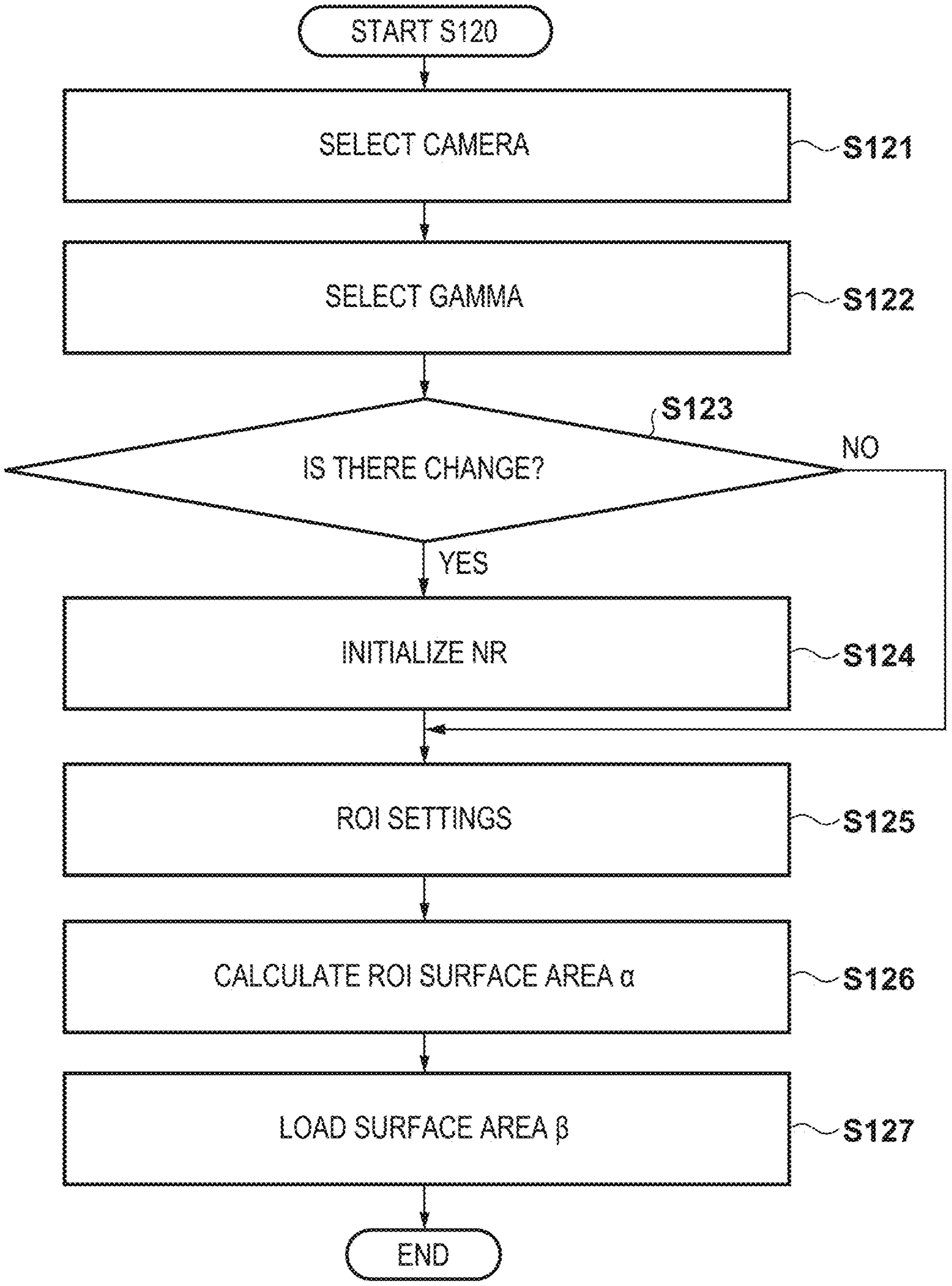
FIG. 5 is a flowchart illustrating an image processing settings subroutine in step S120.

In step S110 of FIG. 2, the CPU 130 stores the input image obtained from the camera 200 by the image input unit 110 in the memory 140. In step S120, the CPU 130 makes image processing settings. FIG. 5 is a flowchart illustrating an image processing subroutine performed in step S120.

In step S121, the CPU 130 obtains information regarding the model of the camera 200, selected by a user or the like using the controller 300, through the operation input unit 150. Note that the CPU 130 may obtain the information on the camera 200 selected by the user from a settings menu or the like of the image processing apparatus 100, or may obtain information on the camera 200 automatically detected by the image input unit 110 from information embedded in the signal of the input image.

In step S122, the CPU 130 obtains information regarding gamma applied in the camera 200, selected by a user or the like using the controller 300, through the operation input unit 150. Note that the CPU 130 may obtain the information regarding gamma selected from a settings menu or the like of the image processing apparatus 100, or may obtain information pertaining to the gamma automatically detected by the image input unit 110 from information embedded in the signal of the input image. The information regarding the model of the camera 200 and the gamma information of the camera 200 are examples of camera information.

In step S123, the CPU 130 determines whether the information on the camera 200 has been changed in step S121, or whether the information on the gamma has been changed in step S122. The CPU 130 moves the sequence to step S124 if the information has been changed, and to step S125 if not.

In step S124, the CPU 130 loads and sets the trained NN parameters, based on the model of the camera 200 and the gamma selected in steps S121 and S122, in the image processing unit 160. Suitable NN parameters trained in accordance with the connected camera 200 and the gamma settings thereof are applied to the NN loaded in the image processing unit 160 as a result. In step S124, the image processing unit 160 can perform NR processing by inference through NN, i.e., by loading the input image from the memory 140.

In step S125 of FIG. 5, the CPU 130 makes ROI settings. The CPU 130 obtains operation signals input by a user or the like from the controller 300 through the operation input unit 150, and sets the ROI as a target area for applying image processing.

Figure 6:
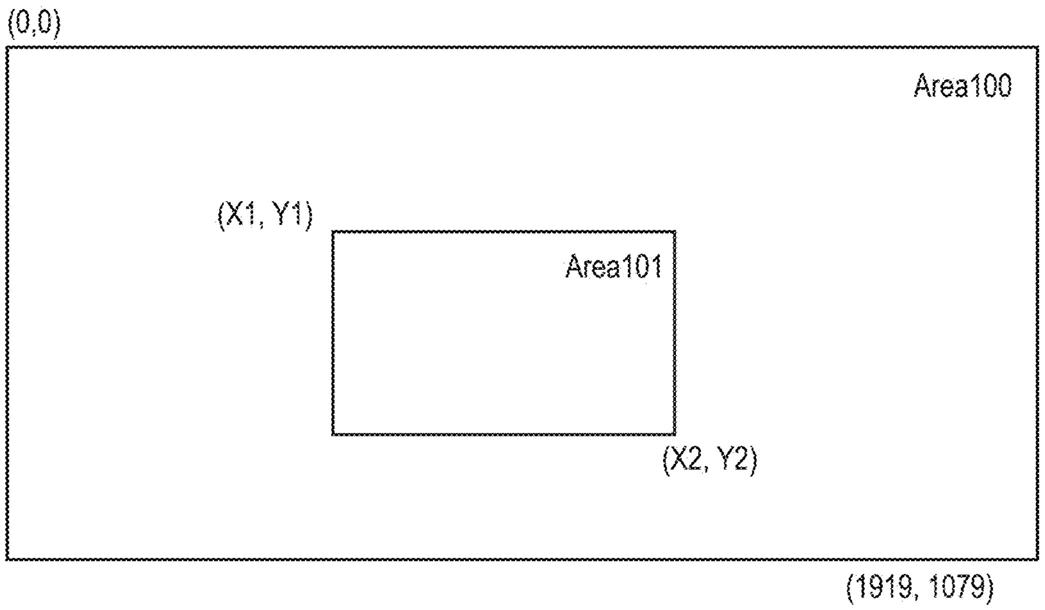
FIG. 6 is a diagram illustrating an example of the setting of an ROI.

FIG. 6 is a diagram illustrating an example of the setting of the ROI. As illustrated in FIG. 6, if, for example, the size of the input image input to the image input unit 110 is 1920×1080, the CPU 130 can define the entire region of the input image as an area 100. Assuming an area 101 is the ROI, the CPU 130 sets starting coordinates (X1,Y1) and ending coordinates (X2, Y2), which are examples of setting values.

In step S126 of FIG. 5, the CPU 130 calculates a surface area $\alpha$ of the ROI. According to the example of the ROI setting illustrated in FIG. 6, the surface area $\alpha$ can be obtained by the following Formula (2).

$$\alpha=|X2-X1|\times|Y2-Y1| \quad \text{Formula (2)}$$

In step S127, the CPU 130 loads a threshold surface area $\beta$ associated with the model of the camera 200 and the gamma selected in steps S121 and S122 from the storage unit 180. The threshold surface area $\beta$ is the minimum area for obtaining an accuracy of the noise estimation processing in step S140 (described later). For example, the CPU 130 may select and load the threshold surface area $\beta$ from a table, stored in the storage unit 180, in which the model and gamma of the camera 200 are associated with the threshold surface area $\beta$. After performing step S127, the CPU 130 ends the image processing settings subroutine in step S120, and moves the sequence to step S130 of FIG. 2.

Figure 7:
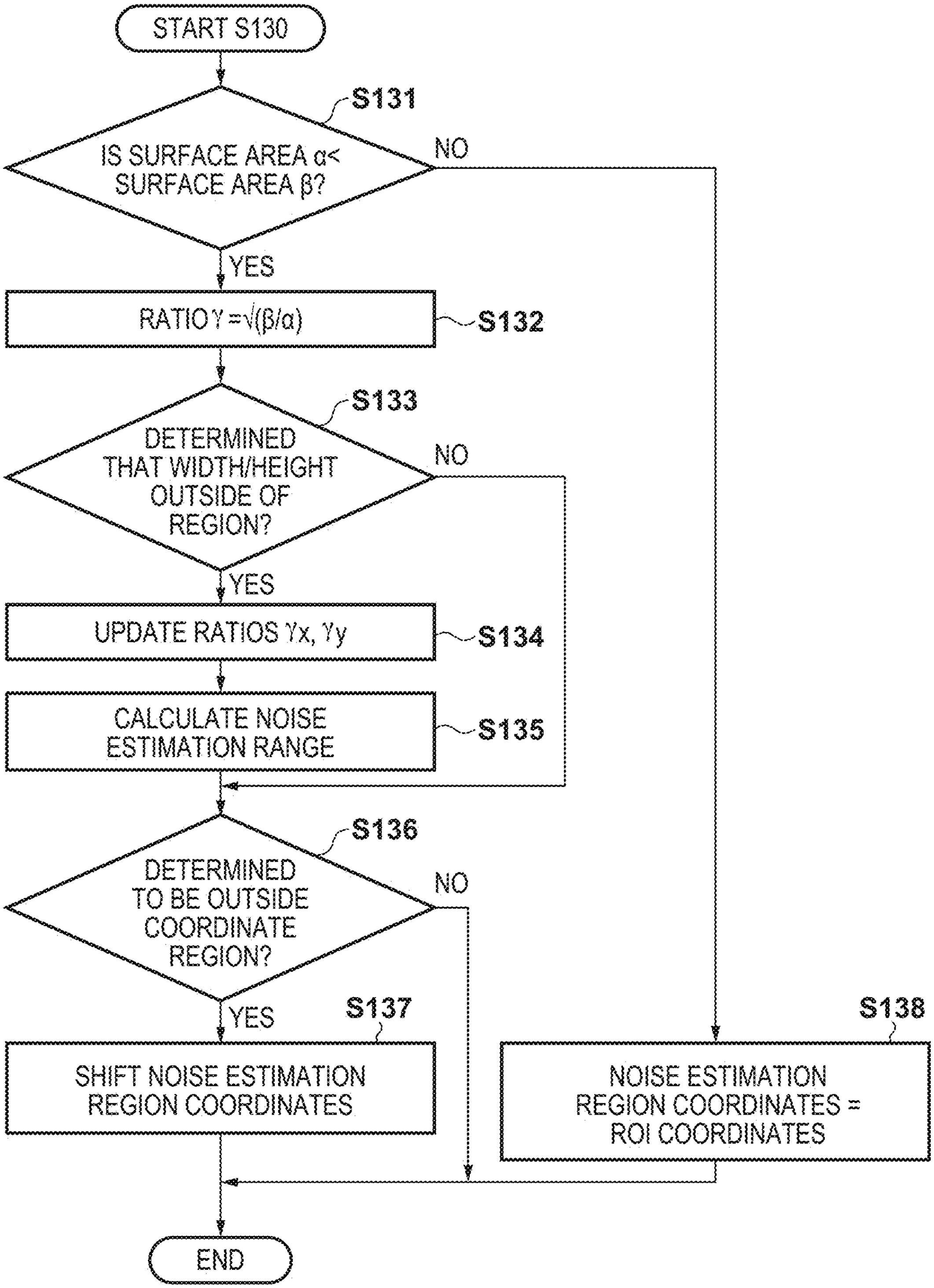
FIG. 7 is a flowchart illustrating a noise estimation region calculation subroutine in step S130.

In step S130 of FIG. 2, the CPU 130 calculates a noise estimation region. FIG. 7 is a flowchart illustrating a noise estimation region calculation subroutine in step S130.

In step S131, the CPU 130 compares the surface area $\alpha$ calculated in step S126, i.e., through Formula (2), with the threshold surface area $\beta$ obtained in step S127. The CPU 130 moves the sequence to step S132 if the surface area $\alpha$ is lower than the threshold surface area $\beta$.

In step S132, the CPU 130 calculates a ratio $\gamma$. Here, if the surface area $\alpha$ of the set ROI is lower than the threshold surface area β and the ROI is taken as a noise estimation region, which is a region for noise estimation processing, the accuracy of the noise estimation processing (described later) may drop. Accordingly, in the present embodiment, the CPU 130 calculates the ratio γ as indicated by Formula (3) for the surface area α of the ROI, so as to secure a noise estimation region that satisfies the threshold surface area Bβ. The CPU 130 calculates the square root of the value obtained by dividing the threshold surface area β by the surface area α as the ratio γ.

$$\gamma = \sqrt{(\beta/\alpha)} \quad \text{Formula (3)}$$

In step S133 of FIG. 7, the CPU 130 determines whether the width and height of a provisional noise estimation region are outside the region of the input image. To obtain a noise estimation region that satisfies the stated threshold surface area β, the CPU 130 calculates a width W1 and a height H1 of the provisional noise estimation region based on the width and height of the ROI and the ratio γ, using the following Formulas (4) and (5). The CPU 130 compares a width W0 and a height H0 of the input image with the calculated width W1 and the height H1, respectively. If the logical sum of Formulas (4) and (5) is true, the CPU 130 moves the sequence to step S134. On the other hand, if the logical sum is false, i.e., if the width W1 and the height H1 of the provisional noise estimation region are both no greater than the width W0 and the height H0 of the input image, the CPU 130 moves the sequence to step S136. Note that a situation where both Formulas (4) and (5) are true does not occur.

$$W1 = |X2 - X1| \times \gamma > W0 \quad \text{Formula (4)}$$

$$H1 = |Y2 - Y1| \times \gamma > H0 \quad \text{Formula (5)}$$

In step S134, the CPU 130 calculates a new ratio γx and a new ratio γy. Here, there may be situations where the logical sum of Formulas (4) and (5) is true, i.e., the width W1 and the height H1 of the noise estimation region calculated by the CPU 130 so as to satisfy the threshold surface area β exceed the width W0 and the height H0 of the input image. In this case, the CPU 130 calculates a new ratio γx and a new ratio γy for taking the width W0 or the height H0 of the input image as an upper limit.

The CPU 130 calculates the ratio γx and the ratio γy through any of the following Formulas (6) to (9), associated with the following conditions. If Formula (4) is true in step S133, the CPU 130 calculates the ratio γx and the ratio γy through Formulas (6) and (7). If Formula (5) is true in step S133, the CPU 130 calculates the ratio γx and the ratio γy through Formulas (8) and (9).

If Formula (4) is true (W1>W0):

$$\gamma x = W0/|X2 - X1| \quad \text{Formula (6)}$$

$$\gamma y = \gamma \times \gamma/\gamma x \quad \text{Formula (7)}$$

If Formula (5) is true (H1>H0):

$$\gamma y = H0/|Y2 - Y1| \quad \text{Formula (8)}$$

$$\gamma x = \gamma \times \gamma/\gamma y \quad \text{Formula (9)}$$

In step S135, the CPU 130 calculates a width W2 and a height H2 of a noise estimation range, serving as a range of the noise estimation region, through the following Formulas (10) and (11), based on the ratio γx and the ratio γy newly calculated in step S134. The area of the region indicated by the width W2 and the height H2 obtained through Formulas (10) and (11) is at least the threshold surface area β.

$$W2 = \gamma x \times |X2 - X1| (\text{where } W2 \le W0) \quad \text{Formula (10)}$$

$$H2 = \gamma y \times |Y2 - Y1| (\text{where } H2 \le H0) \quad \text{Formula (11)}$$

In step S136, the CPU 130 converts the width W2 and the height H2 into starting coordinates (X3, Y3) and ending coordinates (X4, Y4) of the noise estimation region, and performs out-of-region determination. In other words, the CPU 130 determines whether at least part of the noise estimation region is outside the input image. Note that if step S135 is not performed, i.e., when a determination of "No" is made in step S133, the CPU 130 may assume that W2=W1 and H2=H1. The CPU 130 determines whether a part is outside the region of the image based on Formulas (12) to (15) indicated below.

$$X3 - X1 - (W2 - |X2 - X1|)/2 < 0 \quad \text{Formula (12)}$$

$$Y3 - Y1 - (H2 - |Y2 - Y1|)/2 < 0 \quad \text{Formula (13)}$$

$$X4 = X2 + (W2 - |X2 - X1|)/2 > (W0 - 1) \quad \text{Formula (14)}$$

$$Y4 = Y2 + (H2 - |Y2 - Y1|)/2 > (H0 - 1) \quad \text{Formula (15)}$$

If the logical sum of Formulas (12) to (15) is true, the CPU 130 moves the sequence to step S137, whereas if the logical sum is false, the subroutine of step S130 of FIG. 7 ends, and the CPU 130 moves the sequence to step S140 of FIG. 2.

In step S137, based on the result of the determination in step S136, the CPU 130 shifts the starting coordinates (X3, Y3) and the ending coordinates (X4, Y4) of the noise estimation region such that the region remains within the region of the input image. The CPU 130 calculates the starting coordinates (X5, Y5) and the ending coordinates (X6, Y6) of the shifted noise estimation region according to the following conditions and Formulas (16) to (23).

X5 and X6 setting conditions:

When $W2=W0$, $X5=0$, $X6=W0-1$ Formula (16)

When Formula (12) is true ($X3<0$), $X5=0$, $X6=W2-1$ Formula (17)

When Formula (14) is true ($X4>W0-1$), $X5=W0-W2$, $X6=W0-1$ Formula (18)

Under other conditions, i.e., when Formula (12) is false ($X3\ge0$) and Formula (14) is false ($X4\le W0-1$), $X5=X3$, $X6=X4$ Formula (19)

Y5 and Y6 setting conditions:

When $H2=H0$, $Y5=0$, $Y6=H0-1$ Formula (20)

When Formula (13) is true ($Y3<0$), $Y5=0$, $Y6=H2-1$ Formula (21)

When Formula (15) is true ($Y4>H0-1$), $Y5=H0-H2$, $Y6=H0$-1 Formula (22)

Under other conditions, i.e., when Formula (13) is false ($Y3\ge0$) and Formula (14) is false ($Y4\le H0-1$), $Y5=Y3$, $Y6=Y4$ Formula (23)

The CPU 130 moves the sequence to step S138 when a determination of "No" is made in step S131, i.e., if the surface area α of the ROI is at least the threshold surface area β. The condition that the surface area α of the ROI is at least the threshold surface area is satisfied in step S138, and the CPU 130 therefore sets the coordinates of the noise estimation region according to the following Formulas (24) to (27).

$$X5 = X1 \quad \text{Formula (24)}$$

$$Y5 = Y1 \quad \text{Formula (25)}$$

$$X6 = X2 \quad \text{Formula (26)}$$

$$Y6 = Y2 \quad \text{Formula (27)}$$

Figure 8A:
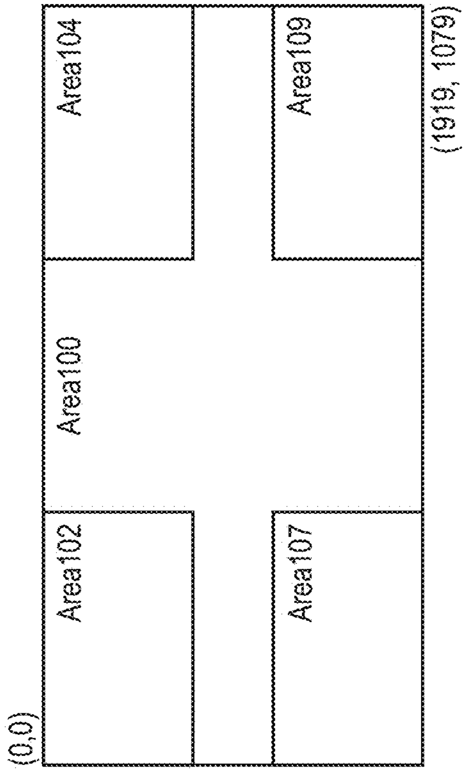
FIG. 8A is a diagram illustrating an example of setting boundaries of an ROI.
Figure 8B:
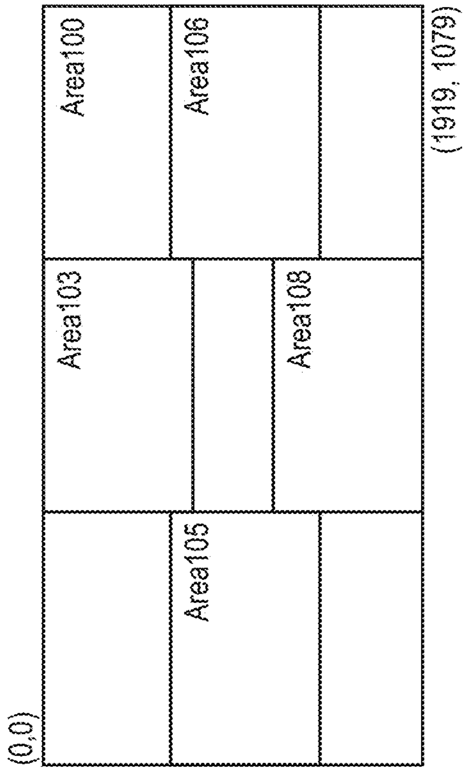
FIG. 8B is a diagram illustrating an example of setting boundaries of an ROI.
Figure 9A:
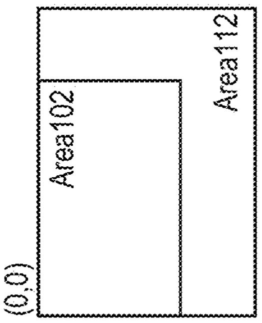
FIG. 9A illustrates an example of setting boundaries of a noise estimation region.
Figure 9B:
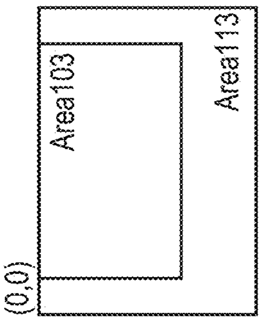
FIG. 9B illustrates an example of setting boundaries of a noise estimation region.
Figure 9C:
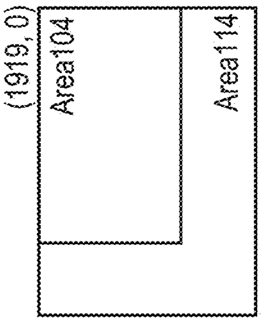
FIG. 9C illustrates an example of setting boundaries of a noise estimation region.
Figure 9D:
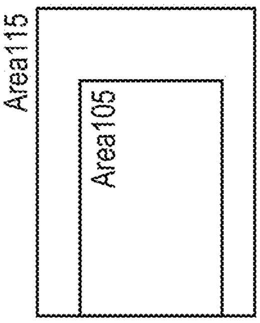
FIG. 9D illustrates an example of setting boundaries of a noise estimation region.
Figure 9E:
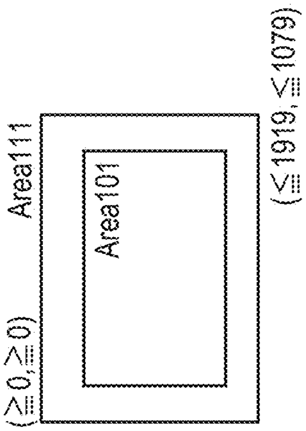
FIG. 9E illustrates an example of setting boundaries of a noise estimation region.
Figure 9F:
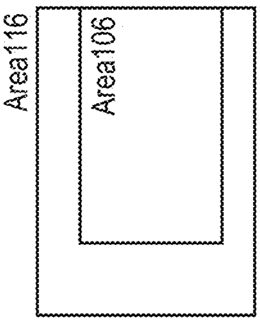
FIG. 9F illustrates an example of setting boundaries of a noise estimation region.
Figure 9G:
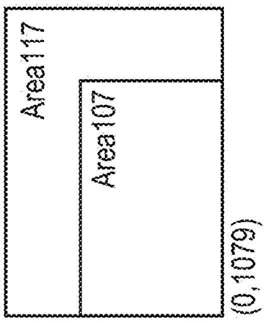
FIG. 9G illustrates an example of setting boundaries of a noise estimation region.
Figure 9H:
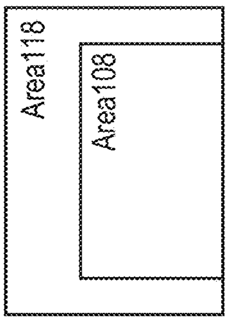
FIG. 9H illustrates an example of setting boundaries of a noise estimation region.
Figure 9I:
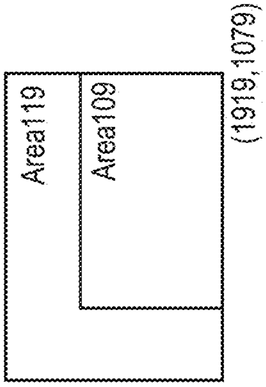
FIG. 9I illustrates an example of setting boundaries of a noise estimation region.

Here, FIGS. 8A and 8B illustrate an example of setting boundaries for the ROI. Assuming that the input image is the area 100, i.e., 1920×1080, it is conceivable for the boundary conditions of the ROI to be area 102 to area 109. Assume that the condition of the surface area α being at least the threshold surface area β is not satisfied in each of the area 102 to the area 109. In this case, the CPU 130 determines the coordinates X5, Y5, X6, and Y6 based on the aforementioned Formulas (16) to (18) and Formulas (20) to (22), as indicated by area 112 to area 119 in FIGS. 9A to 9I, in order to satisfy the stated condition. Note that when the area 111 in which the surface area is at least the threshold surface area β with respect to the area 101 of the ROI does not reach the boundary of the input image as indicated in FIG. 9E, the CPU 130 determines the coordinates X5, Y5, X6, and Y6 based on Formulas (19) and (23).

After performing step S137 or step S138 and determining the coordinates of the noise estimation region, the CPU 130 ends the subroutine in step S130 of FIG. 7, and moves the sequence to step S140 of FIG. 2.

Figure 10:
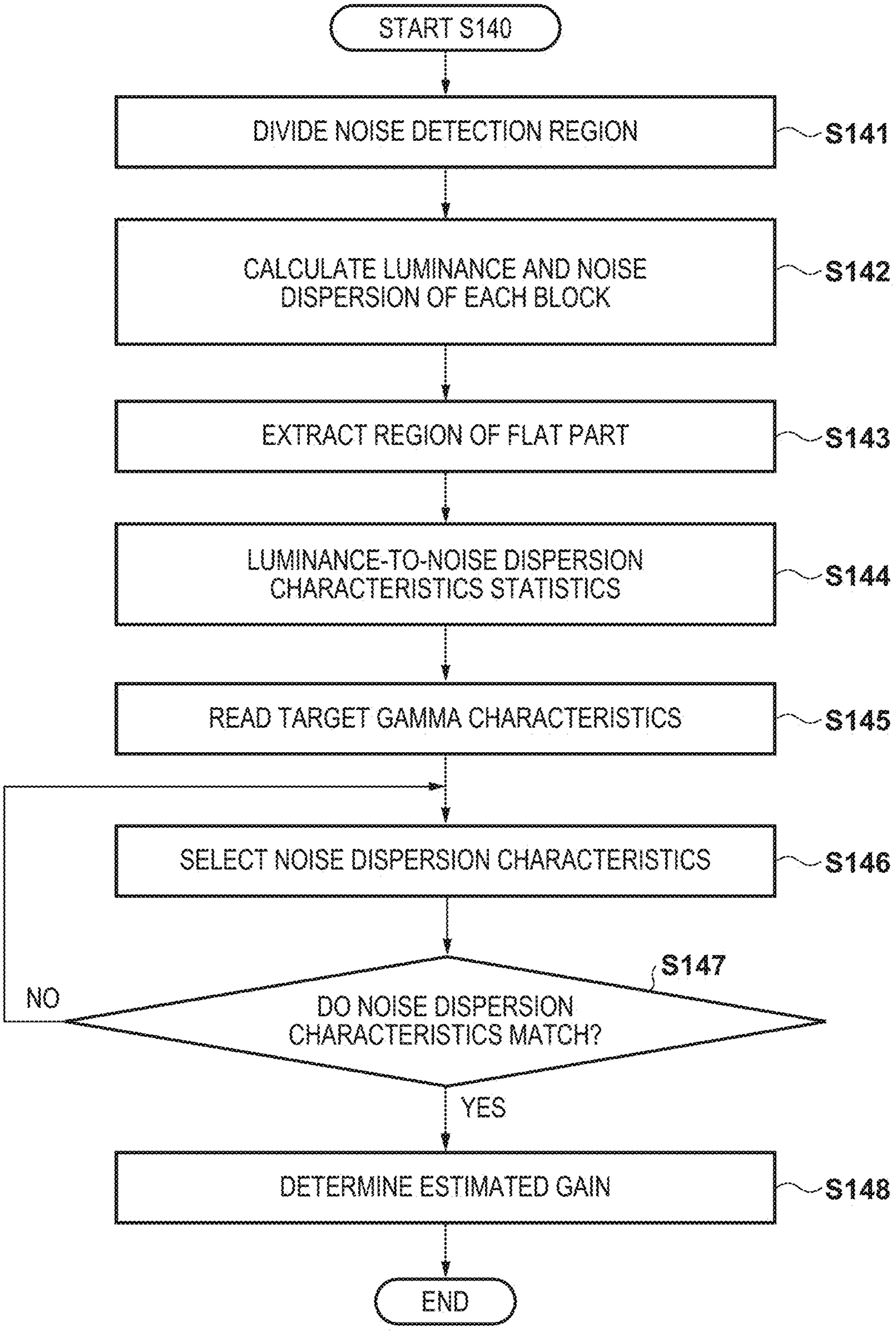
FIG. 10 is a flowchart illustrating a noise estimation processing subroutine in step S140.

In step S140 of FIG. 2, the image processing unit 160 performs noise estimation processing using the noise estimation region determined in step S130. FIG. 10 is a flowchart illustrating noise estimation processing subroutine for estimating noise dispersion characteristics, performed in step S140.

In step S141 of FIG. 10, the image processing unit 160 divides the noise estimation region into blocks. For example, the image processing unit 160 divides the noise estimation region into regions each containing 3×3 pixels as one block.

In step S142, the image processing unit 160 calculates a luminance and noise dispersion for each block.

In step S143, the image processing unit 160 extracts a region of a flat part in the noise estimation region. Specifically, the image processing unit 160 determines whether the noise dispersion in each block is no greater than a predetermined threshold, and extracts the region of the flat part. For example, when the image processing unit 160 determines that the noise dispersion of the block is no greater than the threshold, that block is determined to be a flat part, and 1 is set for that block, as illustrated of FIG. 11. On the other hand, when the image processing unit 160 determines that the noise dispersion of the block is greater than the threshold, that block is determined not to be a flat part, and 0 is set for that block. When a difference in luminance, such as texture information of the subject, is present from block to block, the difference in luminance is calculated as the noise dispersion, which makes it difficult to estimate the noise correctly. Accordingly, the image processing unit 160 determines the blocks that have flat parts in advance using the stated threshold.

In step S144, the image processing unit 160 collects statistical values for luminance-to-noise dispersion only for the blocks determined to be flat parts, and plots the luminance-to-noise dispersion characteristics.

In step S145, the image processing unit 160 loads noise dispersion characteristic data corresponding to the gamma characteristics currently set from the storage unit 180. The noise dispersion characteristic data is stored in the storage unit 180 after measuring the luminance-to-noise dispersion characteristics for each of gain values in advance according to the connected camera 200 and the set gamma. For example, table data having luminance-to-noise dispersion characteristics, such as that illustrated in FIGS. 12A and 12B, is held in the storage unit 180.

In step S146, the image processing unit 160 selects the noise dispersion characteristics for each gain held in the loaded noise dispersion characteristics table.

In step S147, the image processing unit 160 measures a distance between the dispersion value at each luminance plotted in step S144 and the noise dispersion value indicated by the noise dispersion characteristic data based on the gain selected in step S146, and determines whether the characteristics match. The image processing unit 160 may determine a match when the distance is no greater than a predetermined threshold. If the noise dispersion characteristics based on the gain do not match in step S147, i.e., a determination of "no" is made, the image processing unit 160 refers to the dispersion value of the noise dispersion characteristic data for the next gain, and determines whether the noise dispersion characteristics based on the gain match. The image processing unit 160 moves the sequence to step S148 if the noise dispersion values are determined to match, i.e., if a determination of "yes" is made. The gain selected in step S146 and determined to match the noise dispersion characteristics in step S147 can be estimated to have been input to the image processing apparatus 100.

Various scenes are captured by the camera 200 and input to the image processing apparatus 100. In step S130 of FIG. 2, the CPU 130 calculates a noise estimation region that satisfies the threshold surface area β. Having the CPU 130 set the noise estimation region to a surface area that is at least the threshold surface area β makes it possible to improve the probability of the image processing unit 160 detecting blocks that are flat parts for the noise dispersion, which makes it possible to increase the number of blocks detected. As a result, the image processing apparatus 100 can increase the amount of information in the dispersion characteristics collected in step S144 of FIG. 11.

Figure 13:
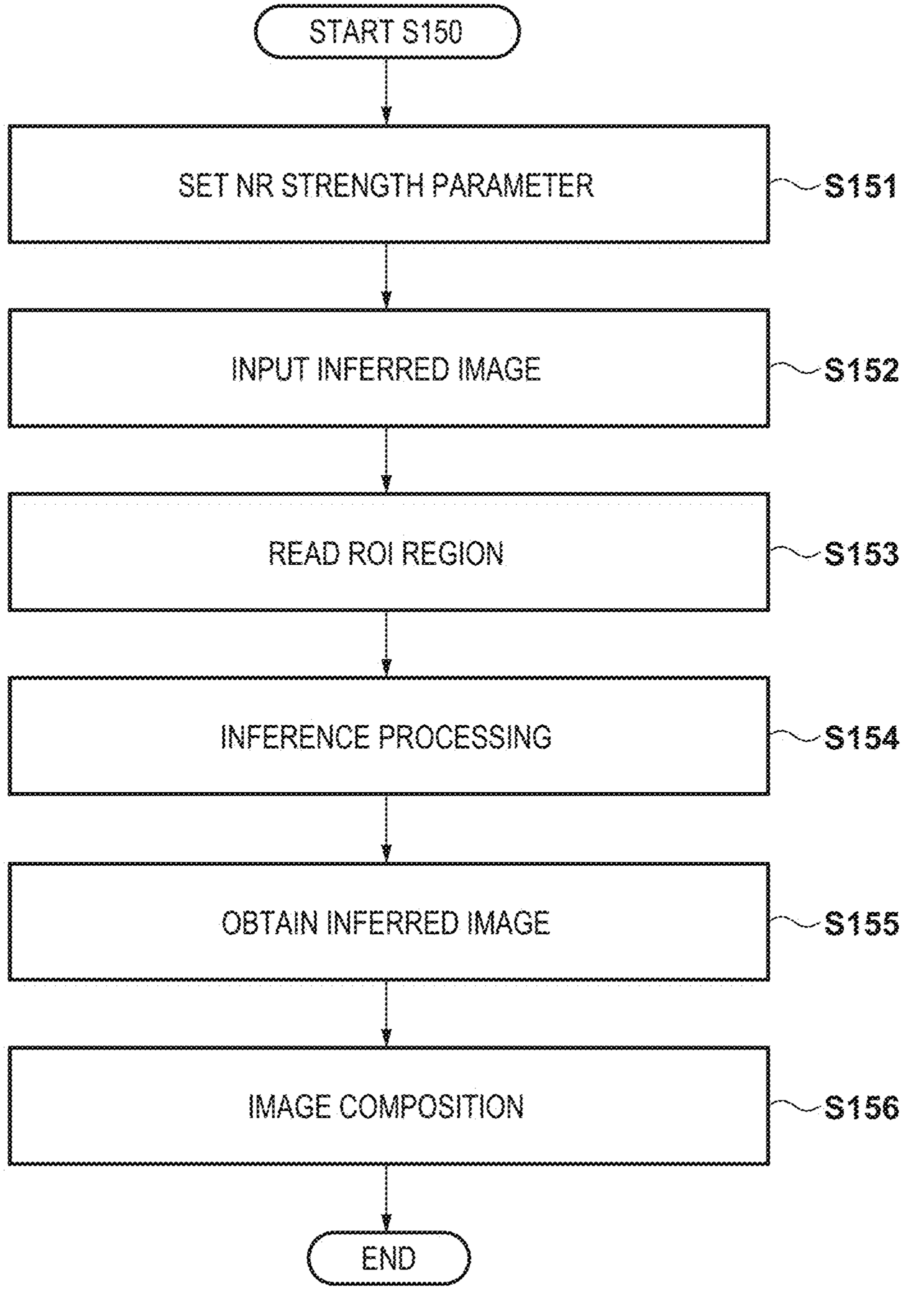
FIG. 13 is a flowchart illustrating an NR processing subroutine in step S150.

Returning to the description of FIG. 10, when step S148 is executed, the subroutine of step S140 of FIG. 10 ends, and the sequence moves to step S150 of FIG. 2. NR processing that reduces noise from the ROI of the input image is performed in step S150 of FIG. 2. FIG. 13 is a flowchart illustrating the NR processing subroutine in step S150.

In step S151 of FIG. 13, the image processing unit 160 sets an NR strength parameter in accordance with the camera 200 and the gamma selected in steps S121 and S122 of FIG. 5, and the gain estimated in step S148 of FIG. 11. The NR strength parameter is a parameter applied to the noise strength parameter 605 illustrated in FIG. 4, and is a parameter for specifying the strength of the noise reduction processing. The NR strength parameter is also a strength parameter applied to an attention map that focuses on noise. The amount of noise input according to the camera 200 and the gamma setting value thereof may be increased or decreased not only by the gain, but also by the set gamma. If estimated at a high gain, the strength parameter is set to a high value, which makes it possible to increase the sensitivity for focusing on noise such that a better NR effect is achieved. On the other hand, if estimated at a low gain, the strength parameter is set lower, which makes it possible to suppress the application of more NR than is necessary, and as a result, the likelihood of suppressing damage caused by the NR, such as a drop in resolution or texture loss, can be increased. The NR strength parameter may be stored in the storage unit 180 as table information corresponding to the camera 200, the gamma, and the estimated gain.

Figure 14C:
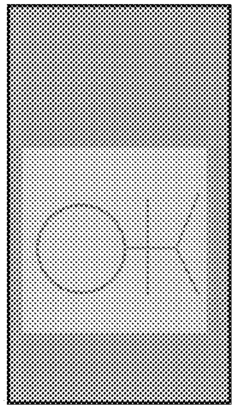
FIG. 14C is a diagram illustrating an example of NR processing on an ROI.

In step S152, the image processing unit 160 loads and obtains the input image, obtained in step S110 of FIG. 2, from the memory 140, in order to perform NR inference. FIG. 14A illustrates an example of an image of a dark area shot by the camera 200. The image in FIG. 14A includes an image of a person, which is obscured by the background. The image processing apparatus 100 obtains an input image to which gain has been applied to the image in FIG. 14A and which therefore contains the noise indicated in FIG. 14B. In the input image illustrated in FIG. 14B, the image of the person can be seen.

In step S153, the image processing unit 160 reads out information such as the coordinates of the set ROI.

In step S154, the image processing unit 160 executes NR inference processing performed by the NN limited to the read-out ROI information.

In step S155, the image processing unit 160 generates a result image inferred through the NR inference processing.

Figure 14B:
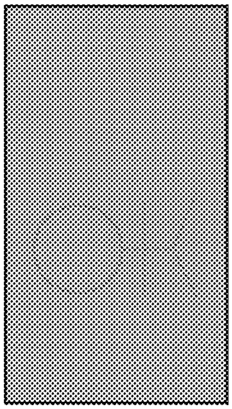
FIG. 14B is a diagram illustrating an example of NR processing on an ROI.
Figure 14A:
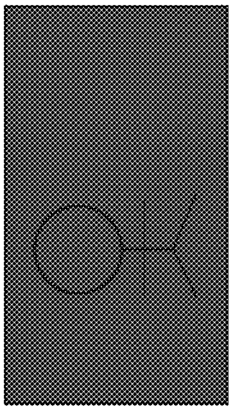
FIG. 14A is a diagram illustrating an example of NR processing on an ROI.

In step S156, the image processing unit 160 composites the image obtained as a result of the NR inference, obtained in step S155, with the input image used for the inference, i.e., the input image illustrated in FIG. 14B. As a result, the image processing unit 160 applies the NR processing only to the selected ROI, and generates an image resulting from the noise in the ROI being reduced, as illustrated in FIG. 14C. After performing step S156, the image processing unit 160 ends the subroutine of FIG. 13 and moves the sequence to step S160 of FIG. 2.

In step S160 of FIG. 2, the CPU 130 outputs the image obtained in step S156 from the image processing apparatus 100 through the image output unit 170, and causes the image to be displayed in the monitor 400. The CPU 130 returns to step S110 after step S160 is executed, and repeats the sequence from step S110 on.

The present embodiment describes an example in which noise dispersion characteristics corresponding to a gain set in the camera 200 are estimated by evaluating an NR application range, which is limited by ROI settings made by a user or the like, against the threshold surface area β, and setting a noise estimation region that is at least the threshold surface area β. The present embodiment makes it possible to appropriately select the NR strength parameter for the NN based on the estimated noise dispersion characteristics according to the gain of the camera 200, which makes it possible to obtain an appropriate NR processing result even for input images containing a large amount of noise, such as images from a low-light environment.

By appropriately setting the noise estimation region in this manner, the present embodiment makes it possible to suppress situations where the result of estimating the noise amount is lower than the desired noise amount, improve the NR effect, and reduce the noise remaining in the input image. Additionally, by appropriately setting the noise estimation region, the present embodiment makes it possible to suppress situations where the result of estimating the noise amount is higher than the desired noise amount, suppress a drop in resolution and loss of textures due to the NR effect being too strong, and improve the image quality.

In the present embodiment, the noise estimation region for estimating the noise dispersion characteristics is set to include at least a part of the ROI for reducing the noise, and thus appropriate noise dispersion characteristics, corresponding to the noise of the ROI, can be estimated.

In the present embodiment, when the ROI is at least the threshold surface area β, the ROI is set as the estimation region, and thus noise dispersion characteristics corresponding to the noise of the ROI can be estimated.

In the present embodiment, the noise estimation region is set using the threshold surface area β corresponding to information on the model and gain of the camera 200, and thus the noise estimation region can be set according to the state of the camera 200.

In the present embodiment, the noise estimation region is set based on the width and height of the provisional noise estimation region, and thus the noise estimation region can be set while maintaining the aspect ratio of the ROI.

In the present embodiment, when the noise estimation region is outside the input image, the noise estimation region is shifted, and thus the noise estimation region can be set within the input image to estimate appropriate noise dispersion characteristics.

Although the foregoing has described a preferred embodiment of the present invention, the present invention is not intended to be limited to the specific embodiment, and all variations that do not depart from the essential spirit of the invention are intended to be included in the scope of the present invention. Parts of the above-described embodiment may be combined as appropriate.

The foregoing embodiment described the noise estimation region that satisfies the threshold surface area β as being calculated as illustrated in FIG. 7. However, if an on-screen display ("OSD", hereinafter) image overlaid by the camera 200 is known in advance as illustrated in FIGS. 15A to 15C, coordinate information such as that illustrated in FIG. 15A may be provided in advance for each connected camera. At this time, as illustrated in FIGS. 15B and 15C, if an overlaid region in which the OSD overlay image is displayed, area 201 and area 202, which are set in advance as noise estimation regions, are set not to overlap with the overlaid region in which the OSD overlay image is displayed by the camera 200. As described above, it is necessary to calculate the noise dispersion in the flat region in order to estimate the appropriate noise. However, if the noise is estimated having included the OSD display region, the noise may be calculated at a low gain, and thus the noise may not overlap with the OSD display region.

The present invention also includes a case where a software program that realizes the functions of the foregoing embodiment is supplied to a system or apparatus having a computer capable of executing the program, directly from a storage medium or using wired/wireless communication, and the program is executed.

Accordingly, the program code itself, supplied to and installed in a computer so as to realize the functional processing of the present invention through a computer, also realizes the present invention. In other words, the computer program itself, for realizing the functional processing of the present invention, is also included within the scope of the present invention.

In this case, the program may be in any form, and object code, a program executed through an interpreter, script data supplied to an OS, or the like may be used, as long as it has the functionality of the program.

Examples of the recording medium that can be used to supply the program include a hard disk, a magnetic recording medium such as magnetic tape, an optical/magneto-optical storage medium, and a non-volatile semiconductor memory.

Additionally, it is conceivable, as the method for supplying the program, to store a computer program embodying the present invention in a server on a computer network, and for a client computer having a connection to download and run the computer program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-158508, filed Sep. 22, 2023, which is hereby incorporated by reference herein in its entirety.

What is claimed is:

1. An image processing apparatus comprising:
one or more memories storing instructions; and
one or more processors executing the instructions to:
execute first setting processing for setting a reduced region in an image;
execute second setting processing for setting an estimation region in the image based on the reduced region;
execute estimation processing for estimating a noise characteristic of the estimation region; and
execute noise reduction processing that reduces noise in the reduced region of the image according to a parameter based on the noise characteristic,
wherein in the second setting processing, when a surface area of the reduced region is smaller than a threshold surface area, the estimation region is set to be at least as large as the threshold surface area.

2. The image processing apparatus according to claim 1, wherein in the noise reduction processing, the noise is reduced based on (i) a first parameter of a trained neural network associated with information on a camera that generated the image and (ii) a second parameter specifying a strength of the noise reduction processing based on the noise characteristic.

3. The image processing apparatus according to claim 1, wherein in the second setting processing, the estimation region is set to include at least a part of the reduced region.

4. The image processing apparatus according to claim 1, wherein in the second setting processing, when the reduced region is at least as large as the threshold surface area, the reduced region is set as the estimation region.

5. The image processing apparatus according to claim 1, wherein in the second setting processing, when the surface area of the reduced region is smaller than the threshold surface area, the estimation region is set to be at least partially different from the reduced region.

6. The image processing apparatus according to claim 1, wherein in the second setting processing, the estimation region is set based on the threshold surface area associated with information on a camera that generated the image.

7. The image processing apparatus according to claim 1, wherein in the second setting processing:
in a case where both a width and a height of a provisional region, calculated based on the reduced region and a ratio that is a square root of a value obtained by dividing the threshold surface area by the surface area of the reduced region, are no greater than a width and a height of the image, the width and the height of the provisional region are set as the width and the height of the estimation region; and
in a case where at least one of the width and the height of the provisional region is greater than the width and the height of the image, the width and the height of the estimation region are set based on at least one ratio among (i) a ratio of the width of the reduced region to the width of the image and (ii) a ratio of the height of the reduced region to the height of the image.

8. The image processing apparatus according to claim 1, wherein in the second setting processing, in a case where part of the estimation region is outside the image, the estimation region is shifted to within the image.

9. The image processing apparatus according to claim 1, wherein in the second setting processing, in a case where an overlaid region in which another image is overlaid is present in the image, the estimation region is set to a region different from the overlaid region.

10. An image processing apparatus comprising:
one or more memories storing instructions; and
one or more processors executing the instructions to:
execute setting processing for setting a reduced region in an image;
execute second setting processing for setting an estimation region in the image based on the reduced region;
execute estimation processing for estimating a noise characteristic of the estimation region; and
execute noise reduction processing that reduces noise in the reduced region according to a parameter based on the noise characteristic, wherein in the second setting processing, in a case where an overlaid region in which another image is overlaid is present in the image, the estimation region is set to a region different from the overlaid region.

11. The image processing apparatus according to claim 10, wherein in the noise reduction processing, the noise is reduced based on (i) a first parameter of a trained neural network associated with information on a camera that generated the image and (ii) a second parameter specifying a strength of the noise reduction processing based on the noise characteristic.

12. An image processing method comprising:

setting a reduced region in an image;

setting an estimation region in the image based on the reduced region;

estimating a noise characteristic of the estimation region; and executing noise reduction processing that reduces noise in the reduced region of the image according to a parameter based on the noise characteristic, wherein in the setting of the estimation region, when a surface area of the reduced region is smaller than a threshold surface area, the estimation region is set to be at least as large as the threshold surface area.

13. A non-transitory computer-readable storage medium having stored thereon a computer program that, when loaded and executed by a computer, causes the computer to:

set a reduced region in an image;

set an estimation region in the image based on the reduced region;

estimate a noise characteristic of the estimation region; and execute noise reduction processing that reduces noise in the reduced region of the image according to a parameter based on the noise characteristic, wherein in the setting of the estimation region, when a surface area of the reduced region is smaller than a threshold surface area, the estimation region is set to be at least as large as the threshold surface area.

* * * * *